United States Patent
Lin (10) Patent No.: US 11,231,113 B1
(45) Date of Patent: Jan. 25, 2022

(54) GATE VALVE WITH LOCKING FUNCTION (71) Applicant: KING LAI HYGIENIC MATERIALS CO., LTD, Zhubei (TW)

(72) Inventor: Cheng-Chimr Lin, Zhubei (TW)

(73) Assignee: KING LAI HYGIENIC MATERIALS CO., LTD, Zhubei (TW)

( * ) Notice: Subject to any disclaimer, the term of this patent is extended or adjusted under 35 U.S.C. 154(b) by 0 days.

(21) Appl. No.: 17/009,287

(22) Filed: Sep. 1, 2020

(30) Foreign Application Priority Data

Jul. 15, 2020 (TW) .................. 109123925

(51) Int. Cl.
*F16K 3/18* (2006.01)
*F16K 3/02* (2006.01)
*F16K 27/04* (2006.01)
*F16K 3/314* (2006.01)
*F16K 3/316* (2006.01)

(52) U.S. Cl.
CPC ............ *F16K 3/182* (2013.01); *F16K 3/0254* (2013.01); *F16K 3/314* (2013.01); *F16K 3/3165* (2013.01); *F16K 27/044* (2013.01)

(58) Field of Classification Search
CPC ...... F16K 3/182; F16K 3/3165; F16K 3/0254; F16K 27/044; F16K 3/314
USPC ........................................ 251/169, 193–204
See application file for complete search history.

(56) References Cited

U.S. PATENT DOCUMENTS

| 3,321,174 | A | * | 5/1967 | Schertler | ................ | F16K 3/182 |
| | | | | | | 251/65 |
| 4,491,145 | A | * | 1/1985 | Williams | ................ | F16K 3/182 |
| | | | | | | 137/312 |
| 4,495,966 | A | * | 1/1985 | Longamore | ............ | F16K 3/182 |
| | | | | | | 137/572 |
| 5,269,491 | A | * | 12/1993 | Reynolds | ................ | F16K 51/02 |
| | | | | | | 251/169 |
| 5,884,899 | A | | 5/1999 | Brenes | | |
| 7,871,061 | B1 | * | 1/2011 | Mandeville, Jr. | ......... | F16K 3/04 |
| | | | | | | 251/169 |
| 9,464,721 | B2 | | 10/2016 | Yang | | |

FOREIGN PATENT DOCUMENTS

| CN | 104204635 A | 12/2014 |
| CN | 209943556 U | 1/2020 |
| EP | 3239567 A1 | 1/2017 |
| JP | 358121387 A | 7/1983 |

(Continued)

*Primary Examiner* — John Bastianelli
(74) *Attorney, Agent, or Firm* — Muncy, Geissler, Olds & Lowe, P.C.

(57) ABSTRACT

A gate valve with a locking function, includes: a housing having a first plate and a second plate, the first plate and the second plate having a valve opening penetrating therethrough respectively; a driving unit; a sliding seat having a plurality of sliding abutment members; a valve member having two cranks swingably arranged on the sliding seat; the two cranks configured to form a parallel equal crank mechanism jointly with the sliding seat and the valve member; and an elastic element; wherein when the sliding seat is at the highest position, the two cranks are of a slanted shape; when the sliding seat is at the lowest position, the two cranks are of a horizontal shape relatively to the housing.

8 Claims, 11 Drawing Sheets

(56) References Cited

FOREIGN PATENT DOCUMENTS

| | | | |
|---|---|---|---|
| JP | 358156781 | A | 9/1983 |
| JP | 358191376 | A | 11/1983 |
| TW | 200736529 | A | 10/2007 |
| TW | I551798 | B | 10/2016 |

* cited by examiner

GATE VALVE WITH LOCKING FUNCTION

BACKGROUND OF THE INVENTION

1. Technical Field

The present invention relates to a gate valve, and in particular, to a gate valve with a locking function.

2. Description of Related Art

Taiwanese Patent No. 1551798, and its counterpart U.S. Pat. No. 9,464,721, discloses a gate valve with secure sealing mechanism, and it mainly uses a driver to drive a swing arm in order to drive a sliding seat to move. In addition, when the swing arm is moved to a second locking position, the valve member on the sliding seat is able to seal its valve opening in order to achieve the effect of locking the valve member during the same time when it is sealed.

When the aforementioned prior art is executing its locking effect, it utilizes the relationship between the swing arm and the driving sliding slot of a non-linear track such that it is able to achieve the locking effect when the valve member seals the valve opening. However, despite that such structure is of the function capable of achieving the locking effect, it is not suitable to applications requiring greater sealing force. In other words, when the valve member requires a greater force to seal the valve opening, then the structure of the aforementioned prior art is not suitable for use.

BRIEF SUMMARY OF THE INVENTION

A primary objective of the present invention is to provide a gate valve with a locking function such that it is more suitable to the application requiring greater force of sealing in comparison to the prior art, and it is capable of maintaining a stable locking state during the sealing thereof.

In view of the above, the present invention provides a gate valve with a locking function, comprising: a housing formed of a flat shape and having a first plate and a second plate, and the housing having an accommodating space arranged at an internal thereof and located between the first plate and the second plate; the first plate and the second plate located at two front and rear sides and having a valve opening penetrating therethrough respectively to face toward each other; and the housing having a bottom portion; a driving unit arranged on the housing and located on top of the housing; the driving unit having a driving shaft penetrating into the accommodating space to extend upward and downward, and arranged between the first plate and the second plate during extension thereof a sliding seat arranged on the driving shaft and driven by the driving shaft to move between a highest position and a lowest position inside the accommodating space; the sliding seat having a plurality of sliding abutment member protruding out of the sliding seat and facing toward an inner side of the first plate; and some of the plurality of sliding abutment members protruding out of a bottom portion of the sliding seat and facing toward the bottom portion of the housing; a valve member having two cranks swingably arranged on the sliding seat; the two cranks having a length substantially identical to each other and configured parallel to each other in order to form a parallel equal crank mechanism jointly with the sliding seat and the valve member; the valve member having a plurality of sliding abutment members protruding out of a bottom portion of the valve member and facing toward the bottom portion of the housing; and an elastic element having one end abutted against the sliding seat and another end abutted against the valve member; an elastic restoring force of the elastic element driving the valve member to move downward relative to the sliding seat; wherein when the sliding seat is at the highest position, the plurality of sliding abutment members of the sliding seat facing toward the bottom portion of the housing are disengaged from the bottom portion of the housing, and the plurality of sliding abutment members of the valve member facing toward the bottom portion of the housing are disengaged from the bottom portion of the housing, and positions of the two cranks arranged on the sliding seat are higher than positions of the two cranks arranged on the valve member such that the two cranks are of a slanted shape; when the sliding seat is at the lowest position, the two cranks are of a horizontal shape relatively to the housing, the plurality sliding abutment members of the sliding seat facing toward the bottom portion of the housing abut against the bottom portion of the housing, and the plurality of sliding abutment members of the valve member facing toward the bottom portion of the housing abut against the bottom portion of the housing, the valve member swings relative to the sliding seat to allow the valve member to seal a position of the valve opening of the second plate, the plurality of sliding abutment members on the sliding seat also abut against the inner side of the first plate, and positions of the two cranks arranged on the sliding seat are substantially at a height identical to positions of the two cranks arranged on the valve member, and the two cranks are substantially of a horizontal shape.

Accordingly, the present invention utilizes the parallel equal crank mechanism formed jointly by the two cranks and the sliding seat and the valve member in order to provide a greater sealing force on the valve member in comparison to the prior art, such that the present invention is suitable to the application requiring greater sealing force while maintaining a stable locked state during the sealing thereof.

DETAILED DESCRIPTION OF THE INVENTION

To describe the technical features of the present invention in detail, the following provides exemplary description of preferred embodiments along with the accompanied drawings.

As shown in FIG. 1 to FIG. 6, according to a preferred embodiment of the present invention, a gate valve 10 with a locking function is provided, mainly comprising a housing 11, a driving unit 21, a sliding seat 31, a valve member 41 and an elastic element 51.

The housing 11 is formed of a flat shape and includes a first plate 12 and a second plate 14, and the housing 11 includes an accommodating space 16 arranged at an internal thereof and located between the first plate 12 and the second plate 14. The first plate 12 and the second plate 14 are located at two front and rear sides and include a valve opening 121, 141 penetrating therethrough respectively. In addition, the housing 11 includes a bottom portion 111. In this embodiment, the bottom portion 111 of the housing 11 is formed by the first plate 12 and the second plate 14 facing toward each other and extend to connect with each other.

The driving unit 21 is arranged on the housing 11 and located on top of the housing 11. The driving unit 21 includes a driving shaft 22 penetrating into the accommodating space 16 to extend upward and downward, and arranged between the first plate 12 and the second plate 14 during extension thereof. In this embodiment, the driving unit 21 comprises a plurality of pneumatic cylinders, and its piston shafts are used as the driving shafts. It shall be noted that the quantity of the pneumatic cylinders may be determined depending upon the actual needs, and under certain satisfying criteria, one single pneumatic cylinder is also acceptable.

The sliding seat 31 is arranged on the driving shaft 22 and is driven by the driving shaft 22 to move between a highest position and a lowest position inside the accommodating space 16. The sliding seat 31 includes a plurality of sliding abutment members 34, and in this embodiment, they refer to rollers with the rolling surfaces protruding out of the sliding seat 31 and facing toward an inner side of the first plate 12. In addition, some of the plurality of sliding abutment members 34 located at a bottom portion of the sliding seat 31 and the rolling surfaces protrude out of the bottom portion of the sliding seat 31 and face toward the bottom portion 111 of the housing 11. In this embodiment, the two left and right sides of the sliding seat 31 include a stabilizing wheel 36 arranged thereon respectively and configured to roll on left and right side walls at the internal of the housing 11, such that it is able to achieve the stabilizing effect during the upward and downward movement of the sliding seat 31.

The valve member 41 includes two cranks 42 swingably arranged on the sliding seat 31. The two cranks 42 have a length substantially identical to each other and are configured parallel to each other in order to form a parallel equal crank mechanism jointly with the sliding seat 31 and the valve member 41. The valve member 41 includes a plurality of sliding abutment members 44, and in this embodiment, they refer to rollers, located at a bottom portion of the valve member 41, and the rolling surfaces protrude out of the bottom portion of the valve member 41 and face toward the bottom portion 111 of the housing 11. In this embodiment, the valve member 41 further includes an engagement member 46.

It shall be noted that although the plurality of sliding abutment members 34 of the sliding seat 31 and the plurality of abutment members 44 of the valve member 41, nevertheless, they shall not be limited to the embodiment of rollers only, and other embodiments, such as curved protruding metal surface or curved protruding surface with a Teflon layer formed thereon, are also possible, in order to slide relative to the bottom portion 111 of the housing 11 or the inner side of the first plate 12 during the abutment thereof.

The elastic element 51, referring to a compression spring in this embodiment, includes one end abutted against the sliding seat 31 and another end abutted against the engagement member 46 of the valve member 41. Its elastic restoring force is able to drive the valve member 41 to move downward relative to the sliding seat 31.

In addition, when the sliding seat 31 is at the highest position, the plurality of sliding abutment members 34 of the sliding seat 31 facing toward the bottom portion 111 of the housing 11 are disengaged from the bottom portion 111 of the housing 11, and the plurality of sliding abutment members 44 of the valve member 41 facing toward the bottom portion 111 of the housing 11 are disengaged from the bottom portion 111 of the housing 11, and the positions of the two cranks 42 arranged on the sliding seat 31 are higher than the positions of the two cranks 42 arranged on the valve member 41 such that the two cranks 42 are of a slanted shape. When the sliding seat 31 is at the lowest position, the plurality sliding abutment members 34 of the sliding seat 31 facing toward the bottom portion 111 of the housing 11 abut against the bottom portion 111 of the housing 11, and the plurality of sliding abutment members 44 of the valve member 41 facing toward the bottom portion 111 of the housing 11 abut against the bottom portion 111 of the housing 11, the valve member 41 swings relative to the sliding seat 31 to allow the valve member 41 to seal a position of the valve opening 141 of the second plate 14, and the plurality of sliding abutment members 34 on the sliding seat 31 also abut against the inner side of the first plate 12, and the positions of the two cranks 42 arranged on the sliding seat 31 are substantially at a height identical to the positions of the two cranks 42 arranged on the valve member 41, and the two cranks 42 are of a horizontal shape relatively to the housing 11.

During the actual implementation, the bottom portion 111 of the housing 11 further includes a stopper member 112 arranged inside the accommodating space 16, and when the sliding seat 31 is at the lowest position, the plurality of sliding abutment members 34 of the sliding seat 31 facing toward the bottom portion 111 of the housing 11 abut against the stopper member 112. The design of such stopper member 112 is able to allow the sliding seat 31 to be maintained at a height difference from the plurality of sliding abutment members 34, 44 at the bottom portion of the valve member 41 when the sliding seat 31 is at the lowest position, such that the plurality of sliding abutment members 34 at the bottom portion of the sliding seat 31 are higher than the plurality of the sliding abutment members 44 at the bottom portion of the valve member 41. Consequently, the stopper member 112 is able to prevent the sliding seat 31 from moving downward to the bottom most portion of the accommodating space 16, thereby reducing the driving stroke of the driving unit 21.

The above describes the structure of the present invention. In the following, the operational states of the present invention are explained in detail.

Figure 5:
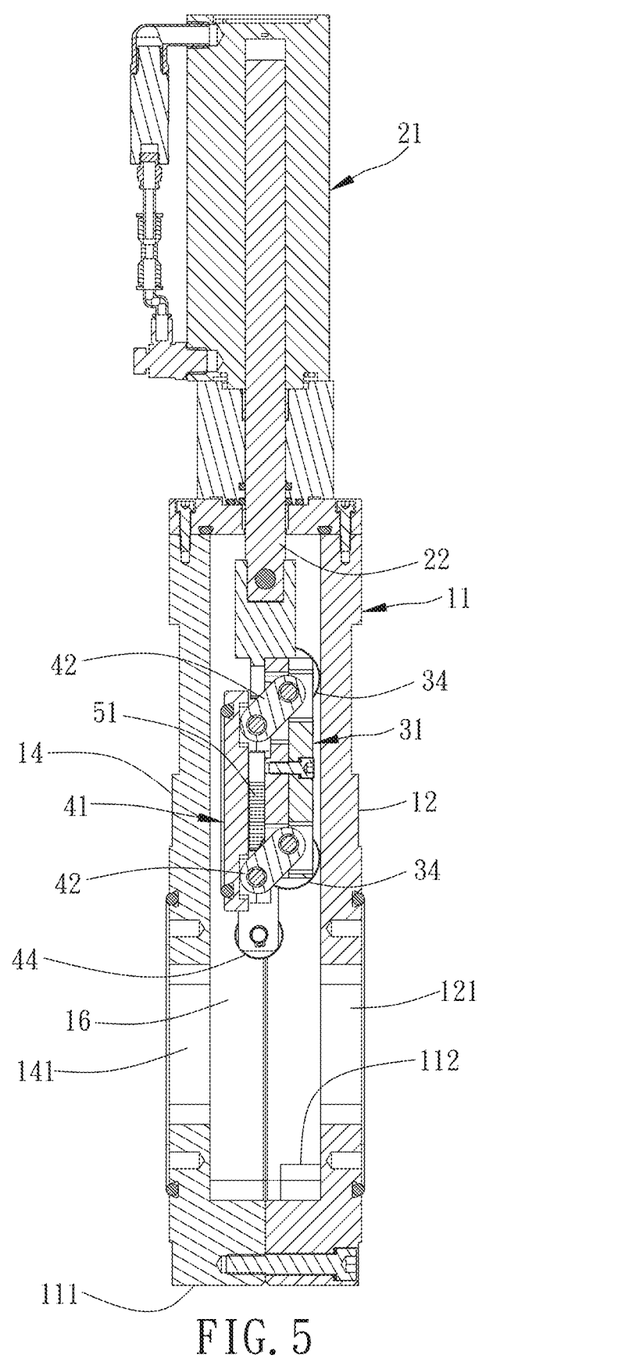
FIG. 5 is a cross sectional view taken along the sectional line 5-5 in FIG. 1.
Figure 6:
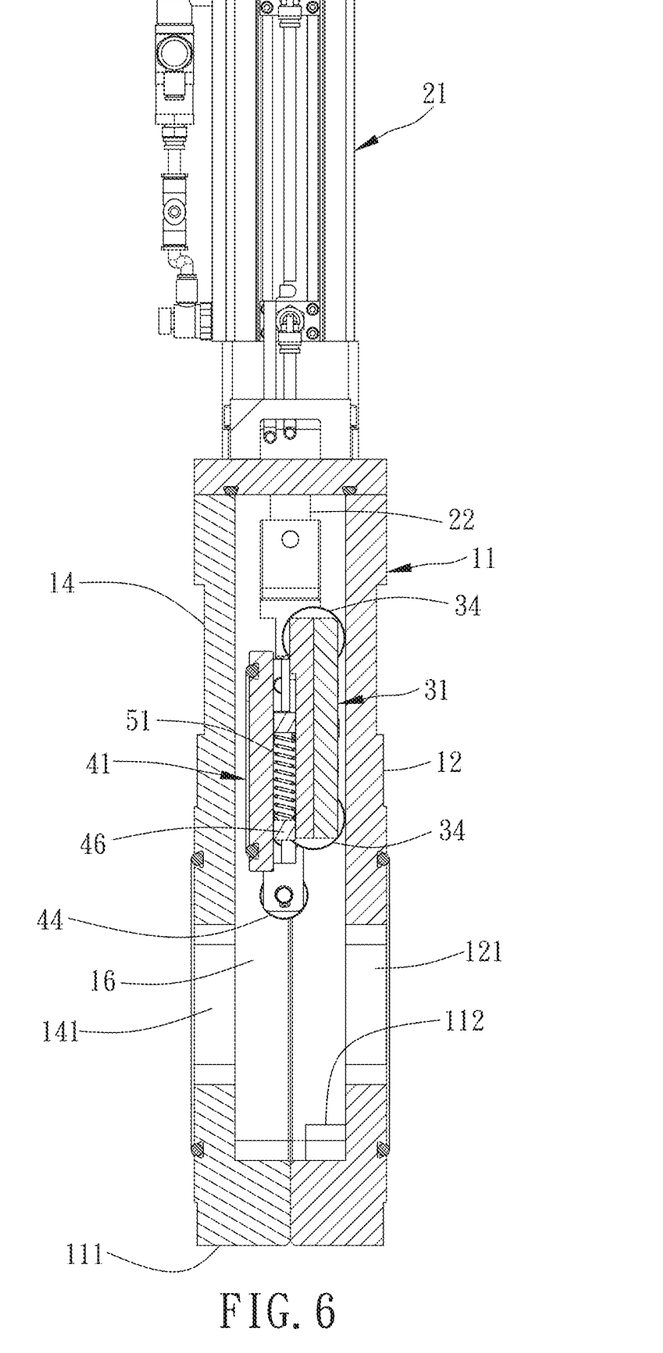
FIG. 6 is a cross sectional view taken along the sectional line 6-6 in FIG. 1.

As shown in FIG. 5, when the sliding seat 31 is located at the highest position, the elastic restoring force of the elastic element 51 is able to push the valve member 41 to move downward to the lowest position relative to the sliding seat 31. At this time, the two cranks 42 are slanted and facing downward, and due to the characteristics of a parallel equal crank mechanism, the valve member 41 is at a distance most adjacent to the sliding seat 31. During the same time, the valve opening 121 of the first plate 12 and the valve opening 141 of the second plate 14 are under an opened state.

Figure 1:
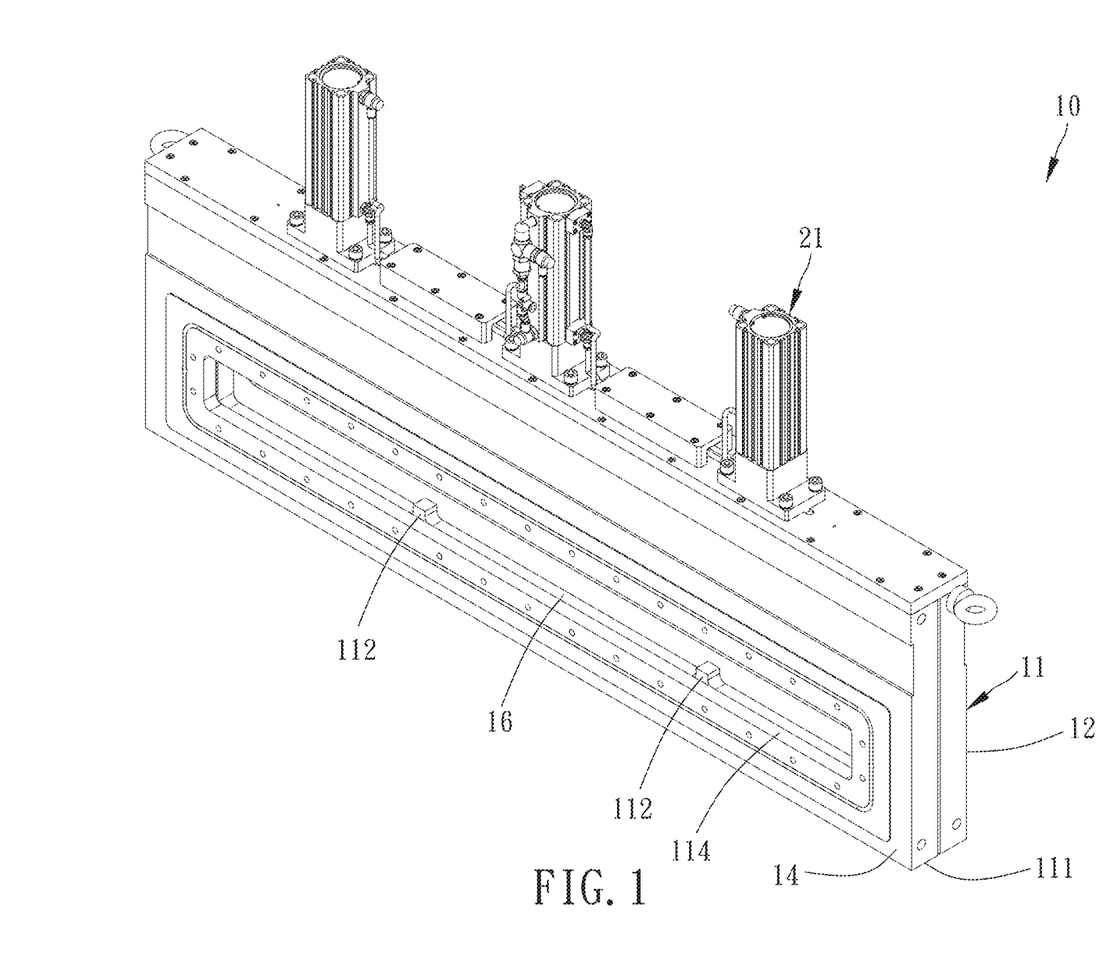
FIG. 1 is an assembly perspective view of the first preferred embodiment of the present invention.
Figure 2:
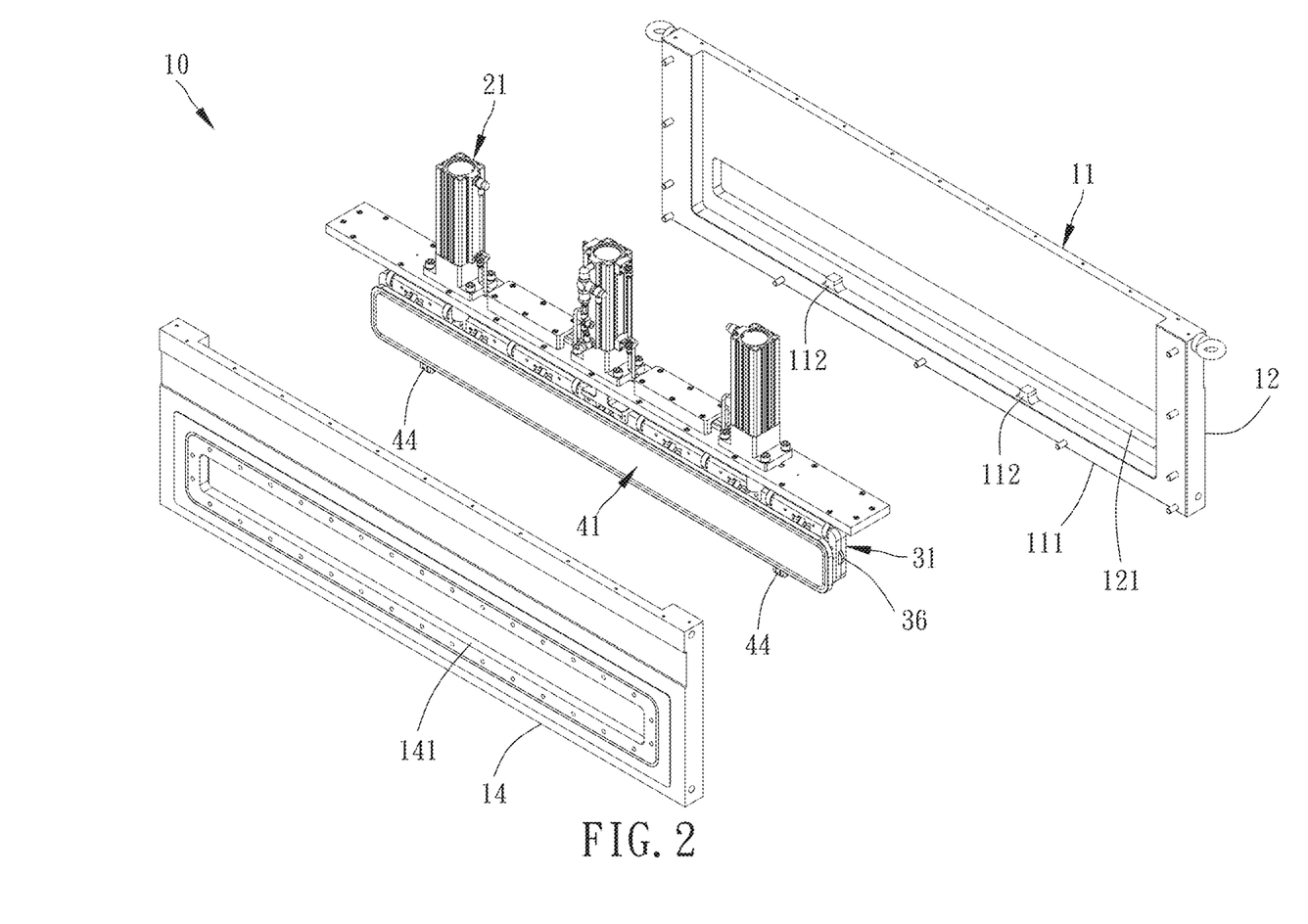
FIG. 2 is a partial exploded view of the first preferred embodiment of the present invention.
Figure 3:
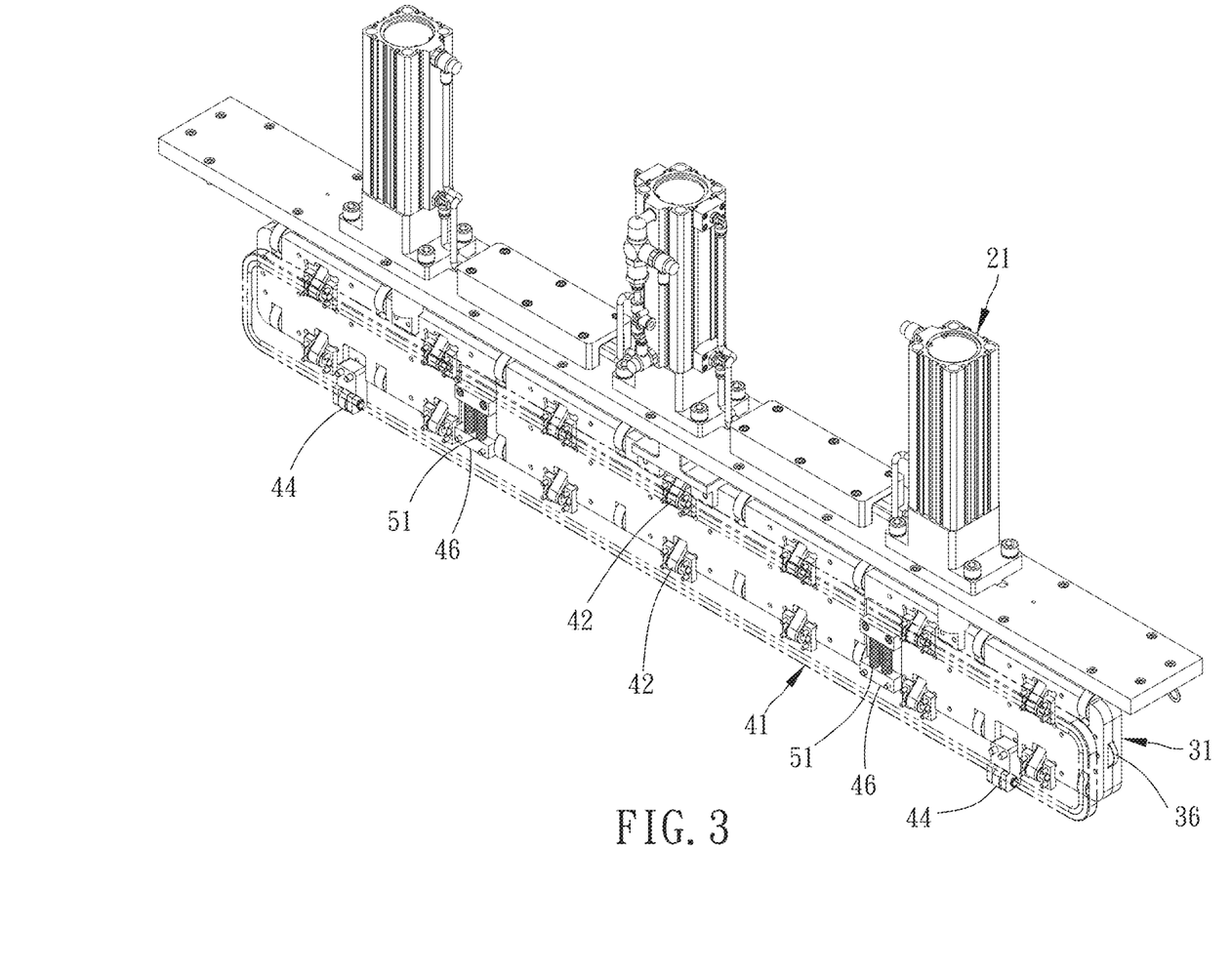
FIG. 3 is a partial structural assembly perspective view of the first preferred embodiment of the present invention, showing the state that the valve member is depicted in an imaginary line after the removal of the first plate and the second plate.
Figure 4:
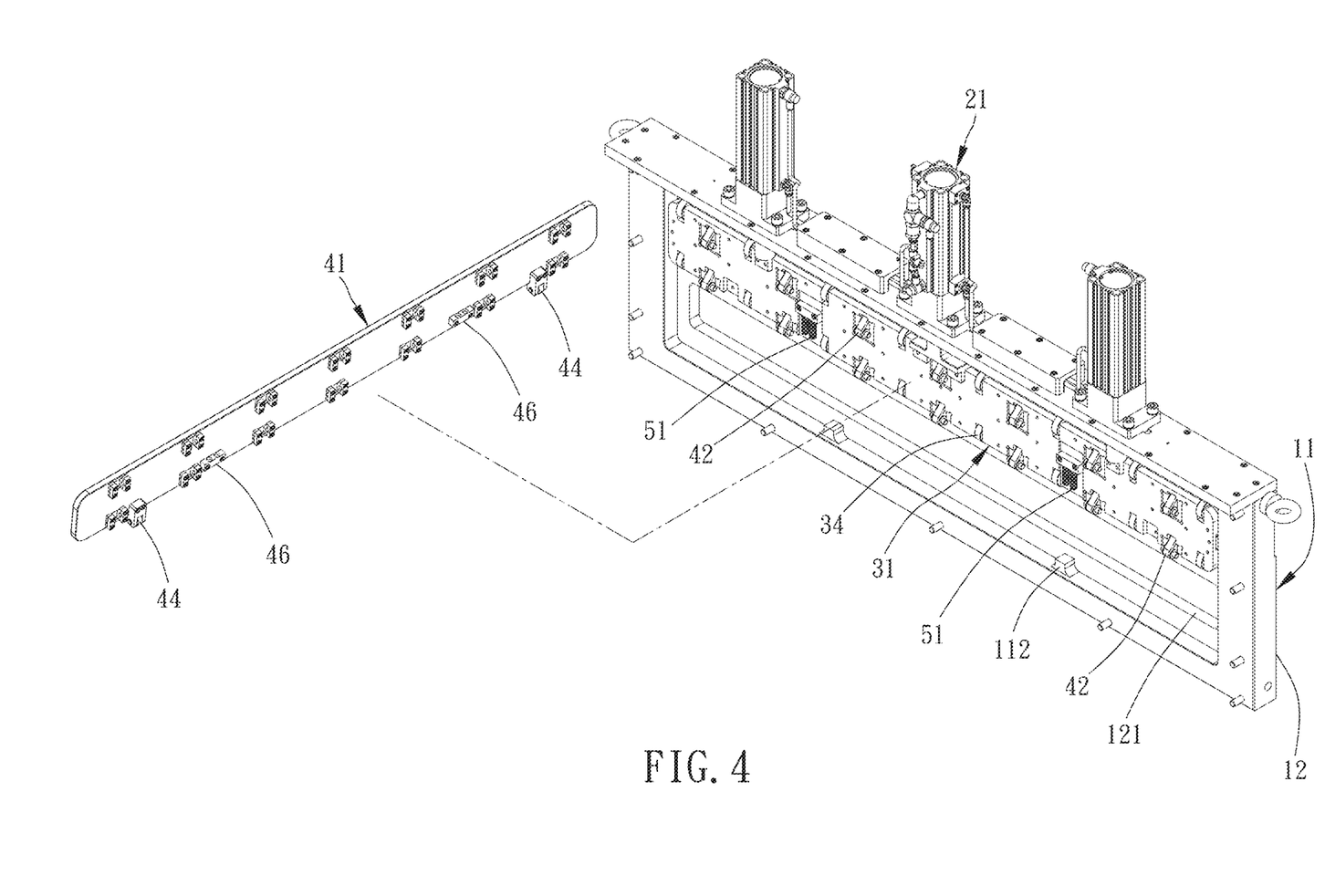
FIG. 4 is another exploded view of the first preferred embodiment of the present invention, showing the state that the second plate is removed and the valve member is flipped over.
Figure 7:
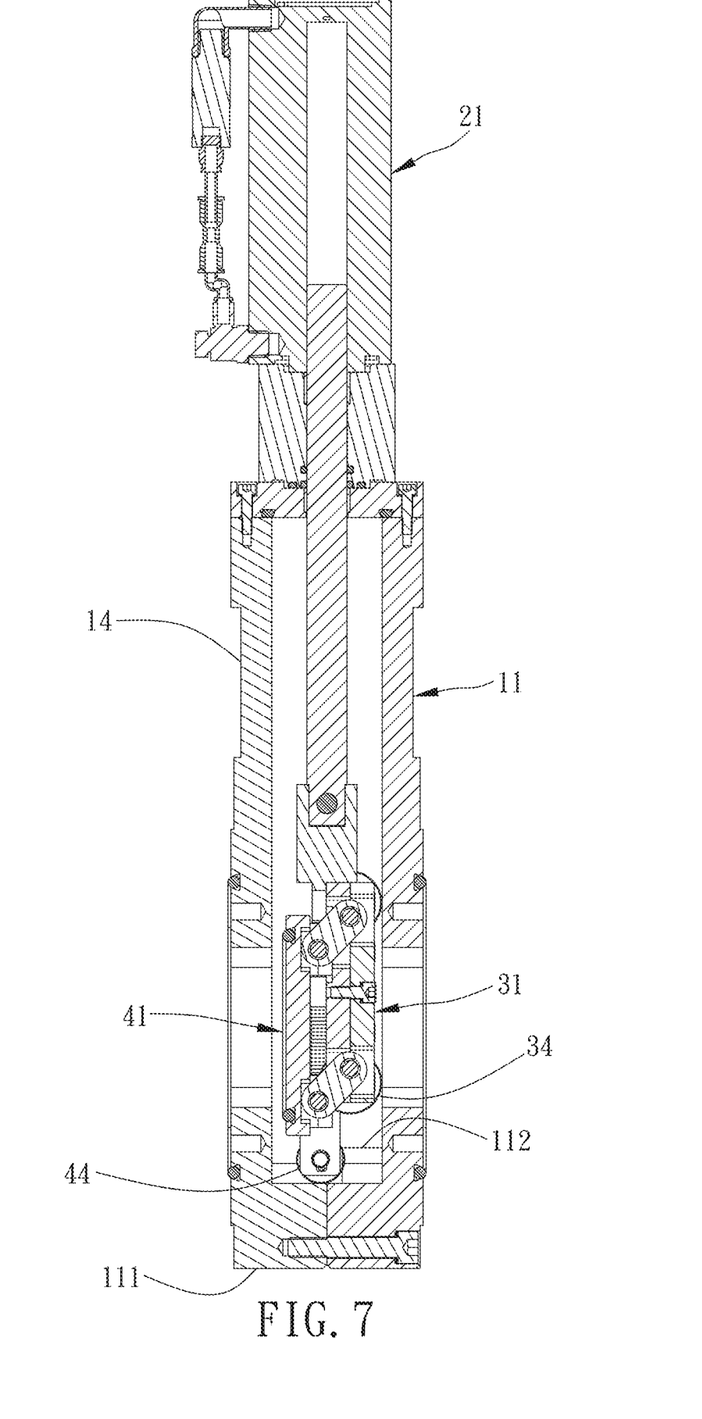
FIG. 7 is a schematic view showing an action of the first preferred embodiment of the present invention.
Figure 8:
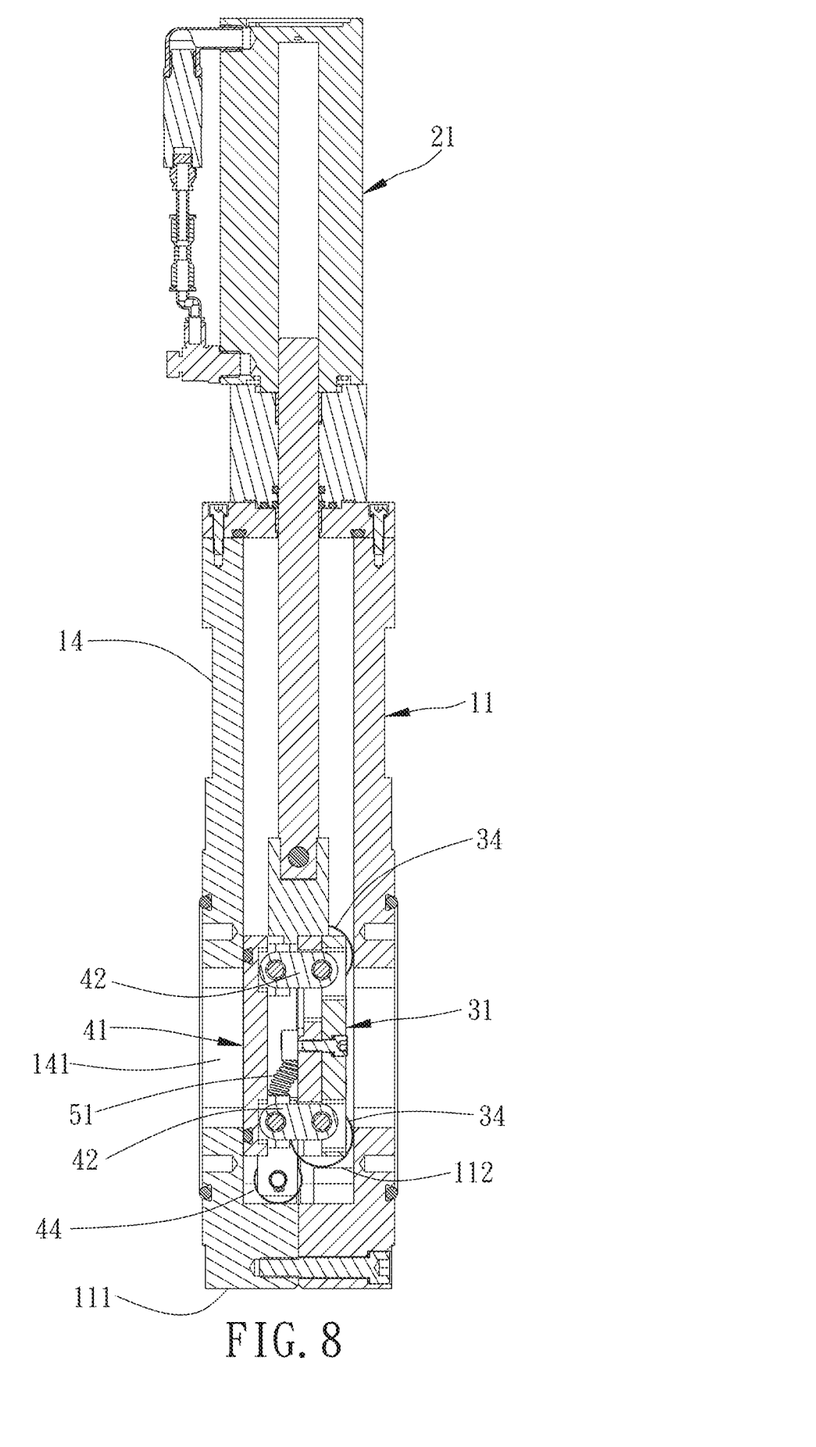
FIG. 8 is a schematic view showing another action of the first preferred embodiment of the present invention.
Figure 9:
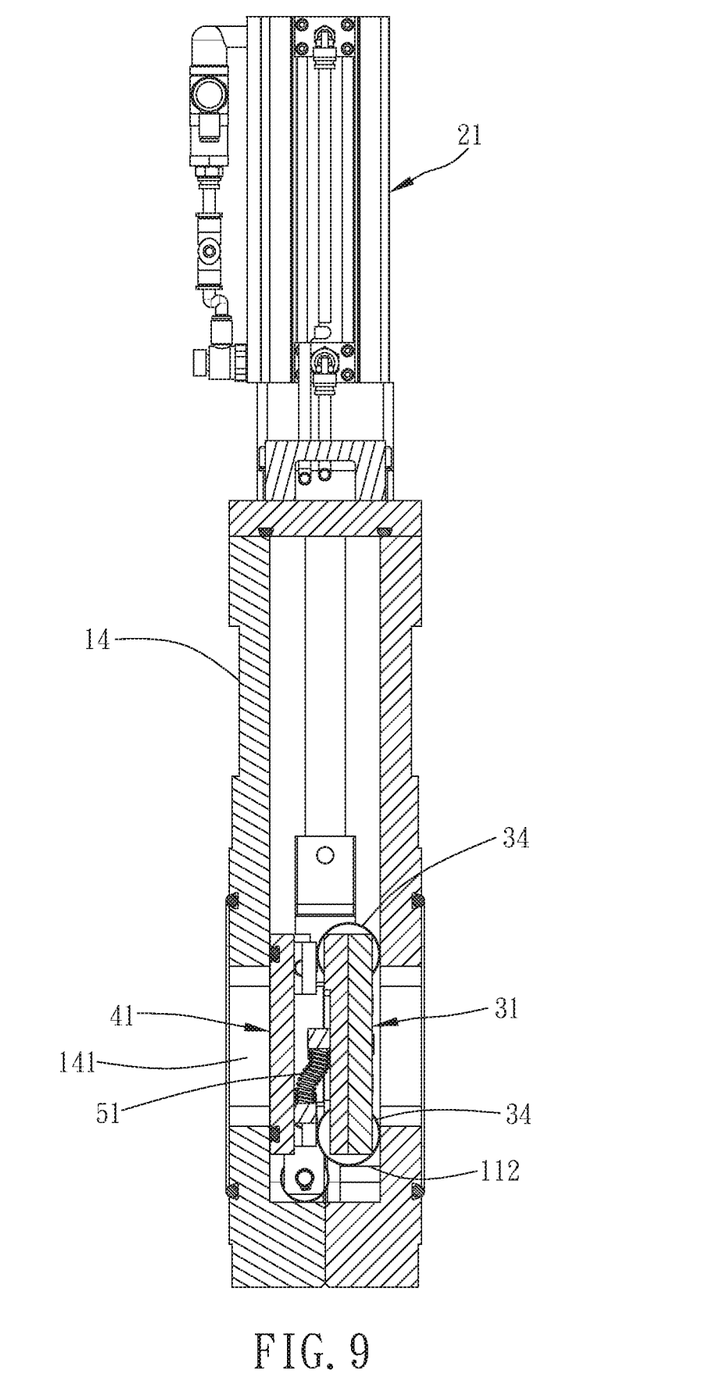
FIG. 9 is a cross sectional view showing the action as illustrated in FIG. 8 and the sectional line at the same position as the one as shown in FIG. 6.
Figure 10:
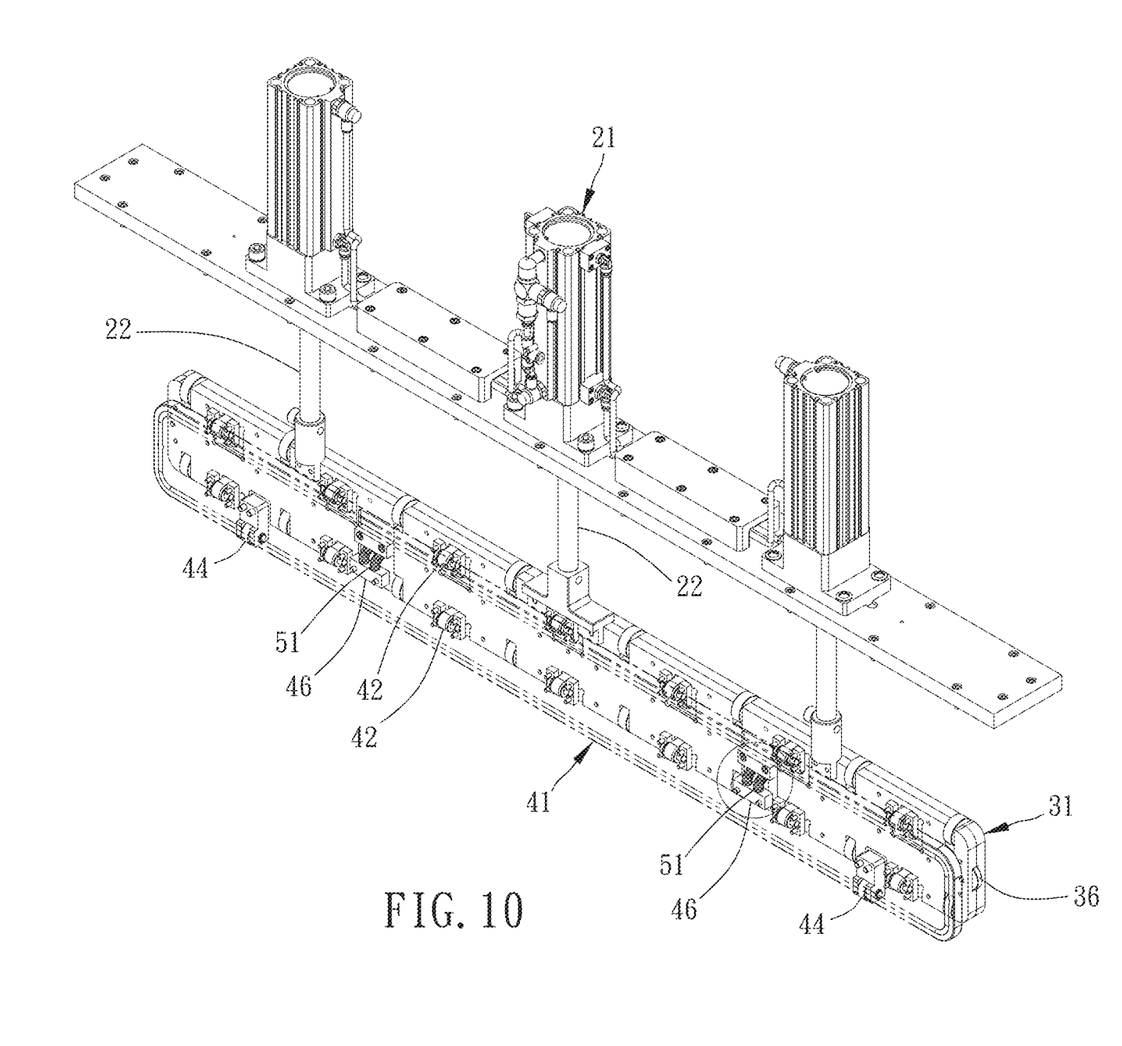
FIG. 10 is a schematic view showing the action as illustrated in FIG. 8 and the viewing angle identical to the one as shown in FIG. 3.
Figure 11:
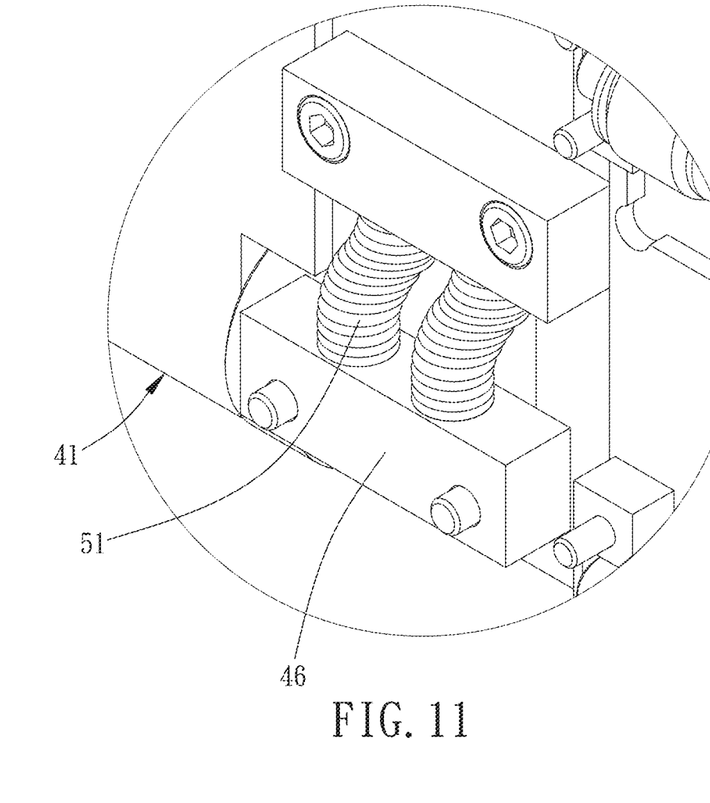
FIG. 11 is a partially enlarged view of FIG. 10.

As shown in FIG. 7 and FIG. 3, during the process when the driving unit 21 drives the sliding seat 31 to descend, the sliding seat 31 is able to utilize the plurality of stabilizing wheels 36 rolling on the inner walls at two left and right sides of the housing 11 (the structure of this part can be easily understood, and the applicant believes that it can be intuitively understood by a person skilled in the art in this field without further illustration of drawings) in order to achieve the stabilizing effect. The plurality of sliding abutment members 44 at the bottom portion of the valve member 41 are able to abut against the bottom portion 111 of the housing 11, and at this time, the plurality of sliding abutment members 34 at the bottom portion of the sliding seat 31 are disengaged from the stopper member 112 such that they are separated from the stopper member 112 by a certain distance. The aforementioned plurality of stabilizing wheels 36 are, in fact, provided for the situation when the present invention is used in a horizontal direction, i.e. the present invention is rotated by 90 degree such that it is under the state where the driving unit 21 is located at one side of the housing 11, and the weight of the sliding seat 31 may cause bending of the driving shaft 22 of the driving unit 21, consequently, the plurality of stabilizing wheels 36 can be used to achieve the supporting effect. Accordingly, when it is used in a vertical direction, i.e. the state as shown in FIG. 1, the plurality of stabilizing wheels 36, in practice, are not required to roll on the inner walls at two left and right sides of the housing 11. In other words, it can be understood that when rolling of the wheels occurs, stabilizing effect can be achieved.

As shown in FIG. 8 to FIG. 11, during the process when the driving unit 21 continues to drive the sliding seat 31 to descend until the plurality of sliding abutment members 34 at the bottom portion of the sliding seat 31 abut against the stopper member 112, the valve member 41 is able to swing toward the second plate 14 due to the characteristics of the parallel equal crank mechanism and based on the relationship of the plurality of sliding abutment members 44 rolling on the bottom portion 111 of the housing 11, and also relative to the elevated position of the sliding seat 31 and further away from the sliding seat 31, i.e. the distance between the valve member 41 and the sliding seat 31 become greater. When the valve member 41 swings to the two cranks 42 to be under the horizontal state, i.e. the state shown in FIG. 8, the valve 41 is able to seal the valve opening 141 of the second plate 14, and the plurality of sliding abutment members 34 of the sliding seat 31 abut against the inner side of the first plate 12. At this time, since the two cranks 42 are under a horizontal state and since the direction of the sealing force of the valve member 41 is the same as the long-axis direction of the two cranks 42, under such condition, the external force applied onto the valve member 41 is parallel to the two cranks 42. Accordingly, the force applied onto the valve member 41 from the valve opening 141 is unable to change the position of the two cranks 42. As a result, it is able to generate an extremely large sealing force, and the locking effect is achieved through the two cranks 42 under the horizontal state. Unless the driving unit 21 drives the sliding seat 31 to retract upward, the valve member 41 stays under the locked sealing state.

To release the sealing state, it only requires to activate the driving unit 21 to drive the sliding seat 31 to move upward, i.e. through a reversal sequence of the aforementioned actions, and the valve member 41 is able to disengage from the valve opening 141, such that the sealing state is released and returning back to the position as shown in FIG. 1 to FIG. 6.

In view of the above, it can be understood that the present invention is able to provide a sealing force greater than that of the prior art. In addition, the present invention is able to utilize the parallel equal crank mechanism jointly formed by the two cranks 42 and the sliding seat 31 and the valve member 41 such that the two cranks 42 are under a horizontal state during sealing, thereby achieving the effect of locking the valve member 41.

What is claimed is:

1. A gate valve with a locking function, comprising:
    a housing formed of a flat shape and having a first plate and a second plate, and the housing having an accommodating space arranged at an internal thereof and located between the first plate and the second plate; the first plate and the second plate located at two front and rear sides and having a valve opening penetrating therethrough respectively to face toward each other; and the housing having a bottom portion;
    a driving unit arranged on the housing and located on top of the housing; the driving unit having a driving shaft penetrating into the accommodating space to extend upward and downward, and arranged between the first plate and the second plate during extension thereof;
    a sliding seat arranged on the driving shaft and driven by the driving shaft to move between a highest position and a lowest position inside the accommodating space; the sliding seat having a plurality of sliding abutment members protruding out of the sliding seat and facing toward an inner side of the first plate; and some of the plurality of sliding abutment members protruding out of a bottom portion of the sliding seat and facing toward the bottom portion of the housing;
    a valve member having two cranks swingably arranged on the sliding seat; the two cranks having a length substantially identical to each other and configured parallel to each other in order to form a parallel equal crank mechanism jointly with the sliding seat and the valve member; the valve member having a plurality of sliding abutment members protruding out of a bottom portion of the valve member and facing toward the bottom portion of the housing; and
    an elastic element having one end abutted against the sliding seat and another end abutted against the valve member; an elastic restoring force of the elastic element driving the valve member to move downward relative to the sliding seat;
    wherein when the sliding seat is at the highest position, the plurality of sliding abutment members of the sliding seat facing toward the bottom portion of the housing are disengaged from the bottom portion of the housing, and the plurality of sliding abutment members of the valve member facing toward the bottom portion of the housing are disengaged from the bottom portion of the housing, and positions of the two cranks arranged on the sliding seat are higher than positions of the two cranks arranged on the valve member such that the two cranks are of a slanted shape; when the sliding seat is at the lowest position, the two cranks are of a horizontal shape relatively to the housing, the plurality sliding abutment members of the sliding seat facing toward the bottom portion of the housing abut against the bottom portion of the housing, and the plurality of sliding abutment members of the valve member facing toward the bottom portion of the housing abut against the bottom portion of the housing, the valve member swings relative to the sliding seat to allow the valve member to seal a position of the valve opening of the second plate, the plurality of sliding abutment members on the sliding seat also abut against the inner side of the first plate, and positions of the two cranks arranged on the sliding seat are substantially at a height identical to positions of the two cranks arranged on the valve member.

2. The gate valve with a locking function according to claim 1, wherein the bottom portion of the housing includes a stopper member arranged inside the accommodating space, and when the sliding seat is at the lowest position, the plurality of sliding abutment members of the sliding seat facing toward the bottom portion of the housing abut against the stopper member.

3. The gate valve with a locking function according to claim 1, wherein the driving unit is a pneumatic cylinder.

4. The gate valve with a locking function according to claim 1, wherein the driving unit comprises a plurality of pneumatic cylinders.

5. The gate valve with a locking function according to claim 1, wherein two left and right sides of the sliding seat include a stabilizing wheel arranged thereon respectively and configured to roll on left and right side walls at the internal of the housing.

6. The gate valve with a locking function according to claim 1, wherein the elastic element is a compression spring.

7. The gate valve with a locking function according to claim 1, wherein the valve member includes an engagement member, and the engagement member is configured to abut against one end of the elastic element.

8. The gate valve with a locking function according to claim 1, wherein the plurality of sliding abutment members of the sliding seat and the plurality of sliding abutment members of the valve member are rollers.

* * * * *